US009607466B2

(12) United States Patent
Hornik

(10) Patent No.: US 9,607,466 B2
(45) Date of Patent: Mar. 28, 2017

(54) WAGERING GAME WITH EVALUABLE SYMBOLS RANDOMLY DETERMINED BY SUB-ARRAYS

(71) Applicant: WMS Gaming Inc., Waukegan, IL (US)

(72) Inventor: Jeremy M. Hornik, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 263 days.

(21) Appl. No.: 14/479,357

(22) Filed: Sep. 7, 2014

(65) Prior Publication Data

US 2015/0072759 A1 Mar. 12, 2015

Related U.S. Application Data

(60) Provisional application No. 61/877,252, filed on Sep. 12, 2013.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC ........ *G07F 17/3213* (2013.01); *G07F 17/326* (2013.01); *G07F 17/34* (2013.01)

(58) Field of Classification Search

USPC ............................ 463/16, 20, 25, 27, 30, 31

See application file for complete search history.

(56) References Cited

U.S. PATENT DOCUMENTS

| | | | | |
|---|---|---|---|---|
| 5,725,428 | A | 3/1998 | Achmuller | |
| 5,752,881 | A | 5/1998 | Inoue | |
| 6,210,275 | B1 | 4/2001 | Olsen | |
| 6,270,411 | B1 | 8/2001 | Gura et al. | |
| 7,175,523 | B2 | 2/2007 | Gilmore et al. | |
| 7,473,173 | B2 * | 1/2009 | Peterson ............. | G07F 17/3211 273/138.1 |
| 8,376,847 | B1 * | 2/2013 | Nelson .................... | G07F 17/32 463/20 |
| 8,480,489 | B2 | 7/2013 | Nelson | |

(Continued)

*Primary Examiner* — Adetokunbo O Torimiro

(74) *Attorney, Agent, or Firm* — Nixon Peabody LLP

(57) ABSTRACT

A gaming system includes one or more input devices, display devices, processors, and memory devices. At least one of the memory devices store instructions that cause the system to receive a wager and to display a main array with main positions including a special position, which is randomly transformed into a sub-array with secondary positions. An outcome for the sub-array is determined in which the secondary positions are populated with respective secondary symbols. The outcome of the sub-array determines a special symbol that is associated with the special position of the main array. The special symbol is displayed for the special position. The main positions are populated with main symbols and the special symbol, the main array including may symbols populating the main positions and any determined special symbols populating the transformed special positions. An evaluation of the main array is performed to determine if a winning combination is achieved.

20 Claims, 12 Drawing Sheets

(56) References Cited

U.S. PATENT DOCUMENTS

| | | | | |
|---|---|---|---|---|
| 2001/0009865 | A1 | 7/2001 | Demar et al. | |
| 2003/0216165 | A1 | 11/2003 | Singer et al. | |
| 2010/0144422 | A1* | 6/2010 | Jackson | G07F 17/34 463/20 |
| 2014/0335934 | A1* | 11/2014 | Meyer | G07F 17/34 463/20 |

* cited by examiner

WAGERING GAME WITH EVALUABLE SYMBOLS RANDOMLY DETERMINED BY SUB-ARRAYS

CROSS-REFERENCE TO RELATED APPLICATIONS

This application claims the benefit of and priority to U.S. Provisional Patent Application No. 61/877,252 titled "Wagering Game With Evaluable Symbols Randomly Determined By Sub-Arrays" and filed on Sep. 12, 2013, which is incorporated herein by reference in its respective entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a gaming system in which sub-arrays determine an outcome of a main array.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

Traditionally, gaming machines operate under control of a processor that has been programmed to execute base games and bonus games in which reel arrays spin and stop to display symbol combinations in a display area. If winning combinations are achieved by the symbol combinations, awards are provided to the players.

SUMMARY OF THE INVENTION

According to one aspect of the present invention, a gaming system includes one or more input devices, display devices, processors, and memory devices. At least one of the memory devices store instructions that cause the system to receive a wager and to display a main array with main positions including a special position, which is randomly transformed into a sub-array with secondary positions. An outcome for the sub-array is determined in which the secondary positions are populated with respective secondary symbols. In response to the outcome of the sub-array, a special symbol is determined. The special symbol is associated with the special position of the main array and has a predetermined association with the sub-array outcome. Any determined special symbols are displayed for each of the randomly transformed special positions. The main positions in the main array are populated with main symbols, the main array including the plurality of main symbols populating the main positions and any determined special symbols populating the transformed special positions. An evaluation of the main array determines if a winning combination is achieved.

According to another aspect of the invention, a gaming system includes one or more input devices, display devices, processors, and memory devices. At least one of the memory devices store instructions that cause the system receive a wager in response to an input via at least one of the one or more input devices. In response to receiving the wager, a main array with main array positions and having a plurality of main reels is displayed on at least one of the one or more display devices. The plurality of main reels are spinned, and, in response to the spinning of the plurality of main reels, one or more sub-arrays are displayed at one or more, but not all, of the main array positions. The one or more sub-arrays have a plurality of secondary reels. While the remainder of the plurality of main reels is still spinning, the plurality of secondary reels of the one or more sub-arrays are spinned, stopped, and evaluated to determine one or more special symbols for populating at least one of the main array positions. In response to determining the one or more special symbols, the remainder of the plurality of main reels is stopped from spinning and the main array positions are populated with primary symbols and the one or more special symbols. The main array is evaluated to determine if a main winning combination is achieved, the evaluation being based on both the primary symbols and the one or more special symbols.

According to a further aspect of the invention, a computer-implemented method in a gaming system includes receiving a wager in response to an input via at least one of one or more input devices, and displaying on at least one of one or more display devices a main array with main array positions and having a plurality of main reels. In response to the spinning of the plurality of main reels, at least one sub-array is randomly displayed, by at least one of the one or more processors, at one or more, but not all, of the main array positions. The at least one sub-array has a plurality of secondary reels. While the remainder of the plurality of main reels is still spinning, the plurality of secondary reels of the at least one sub-array is spinned, stopped, and evaluated, by at least one of the one or more processors, to determine one or more special symbols for populating at least one of the main array positions. In response to determining the one or more special symbols, the spinning of the remainder of the plurality of main reels is stopped, by at least one of the one or more processors, and the main array positions are populated with primary symbols and the one or more special symbols. The main array is evaluated, by at least one of the one or more processors, to determine if a main winning combination is achieved, the evaluation being based on both the primary symbols and the one or more special symbols.

According to another further aspect of the invention, a computer-implemented method in a gaming system includes displaying on at least one of one or more display devices a main array with a plurality of main positions, and randomly transforming, by at least one of one or more processors, a special position of the plurality of main positions into a sub-array. The method further include determining, by at least one of the one or more processors, a sub-array outcome and a special symbol based on the sub-array outcome. The main array is populated with a plurality of main symbols that include the special symbol, the plurality of main symbols being displayed in respective ones of the plurality of main positions with the special symbol being displayed in the special position. The main array is evaluated to determine if a winning combination is achieved.

Additional aspects of the invention will be apparent to those of ordinary skill in the art in view of the detailed description of various embodiments, which is made with reference to the drawings, a brief description of which is provided below.

Figure 1:
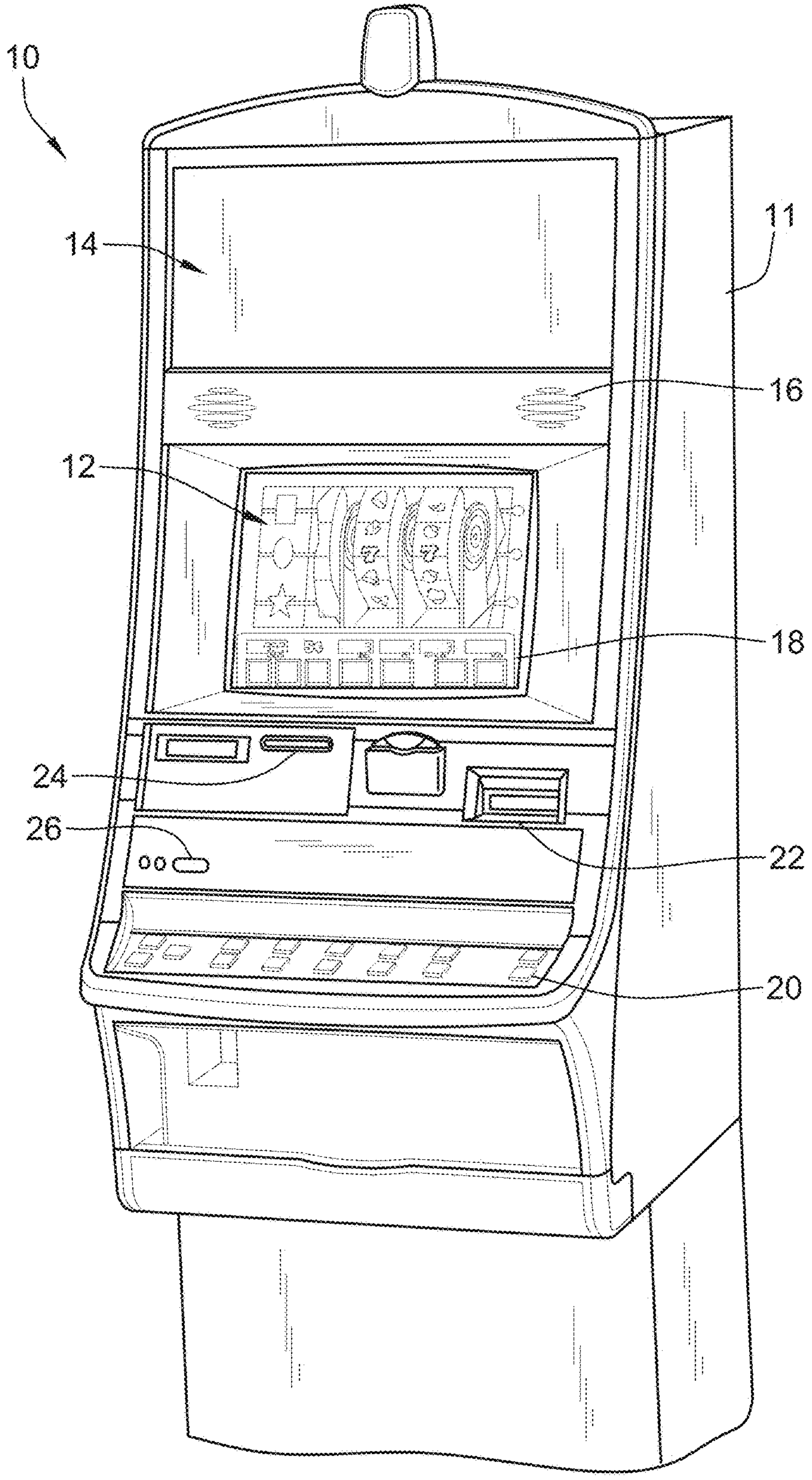
FIG. 1 (PRIOR ART)
FIG. 1 is a perspective view of a free-standing gaming terminal.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a main display area 12, a secondary display area 14, and one or more audio speakers 16. The main display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the main or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
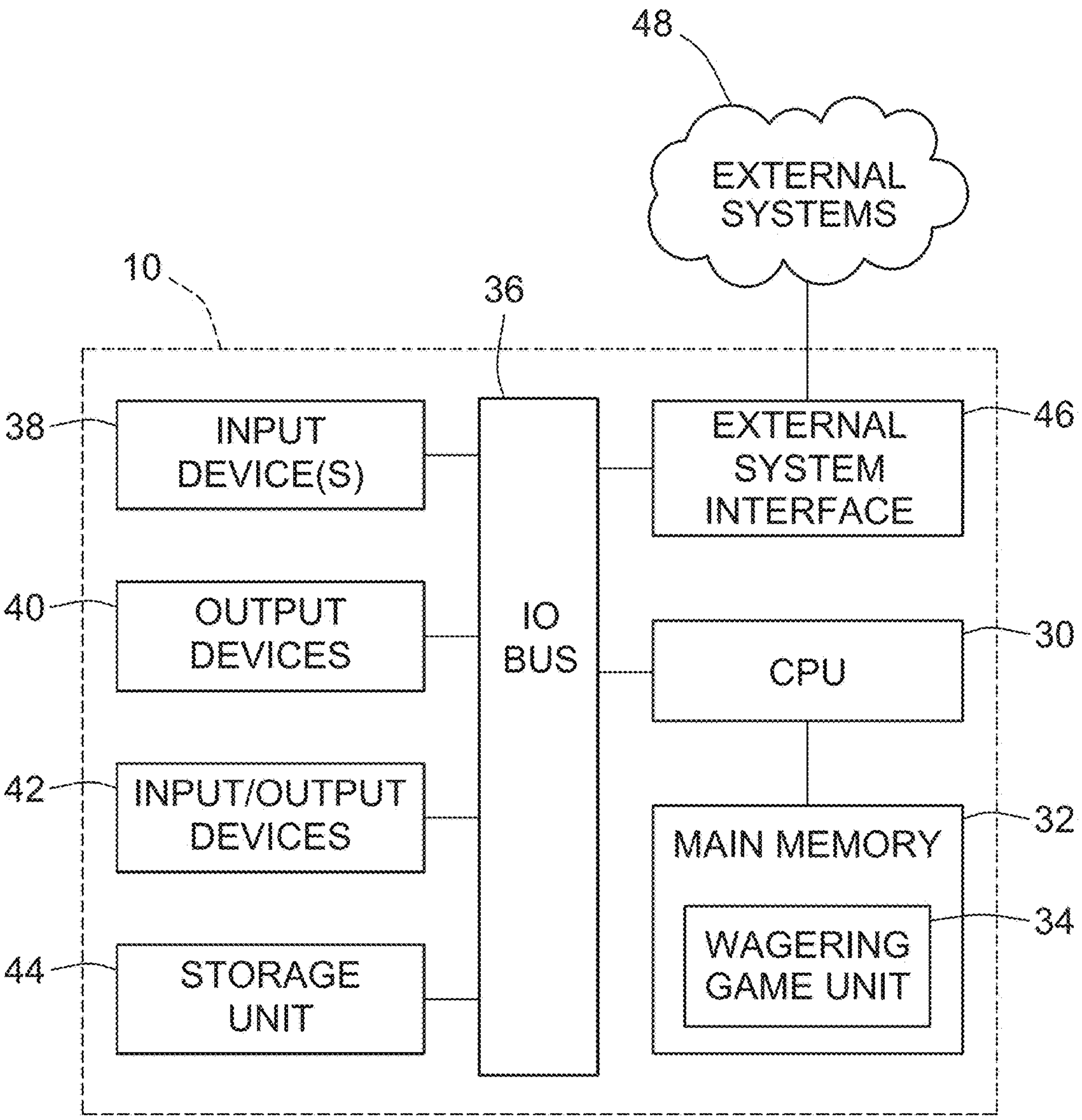
FIG. 2 (PRIOR ART)
FIG. 2 is a schematic view of a gaming system.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
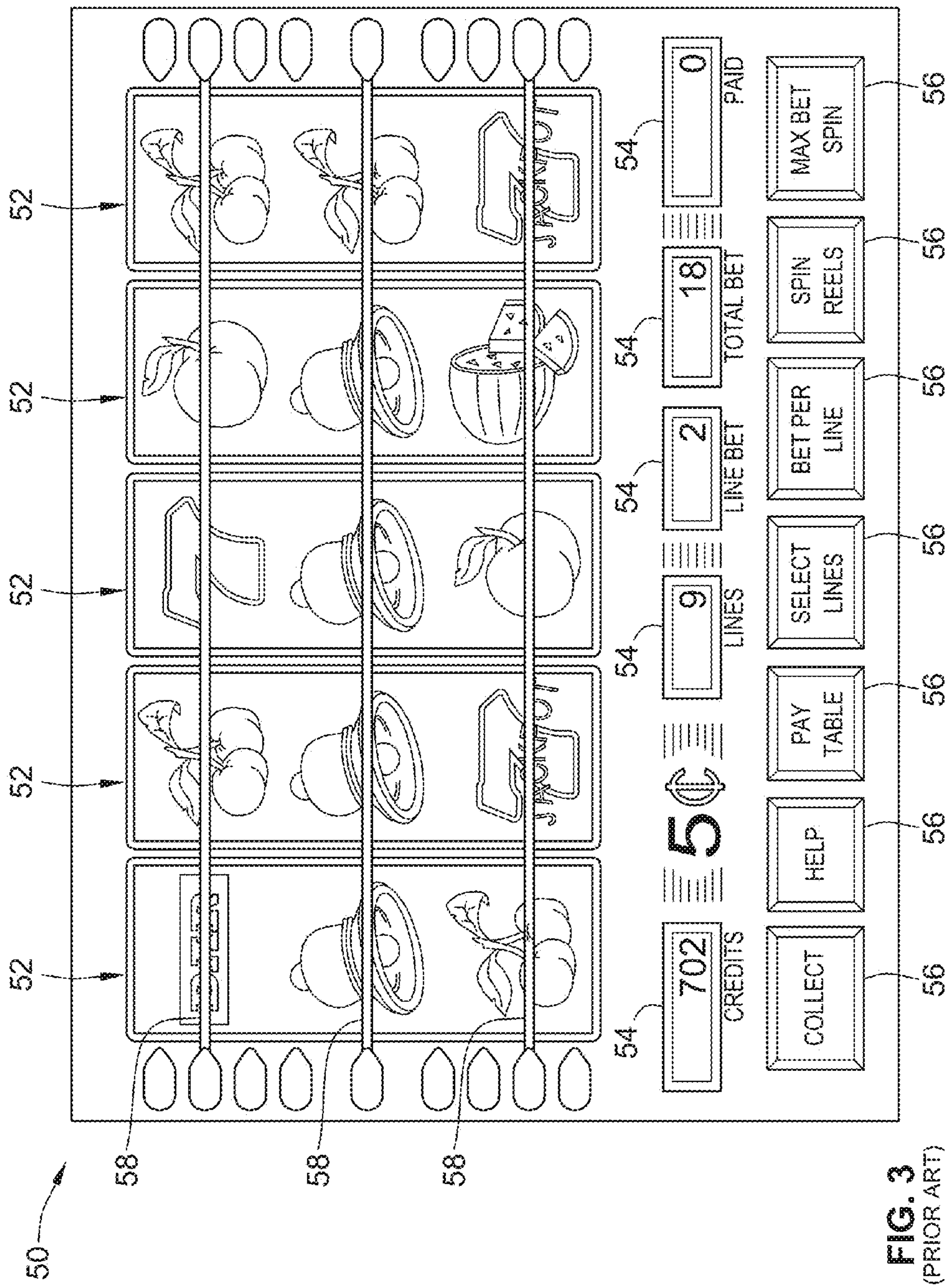
FIG. 3 (PRIOR ART)
FIG. 3 is an image of an exemplary basic-game screen of a wagering game displayed on a gaming terminal.

Referring now to FIG. 3, there is illustrated an image of a basic-game screen 50 adapted to be displayed on the main display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the main display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., main display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the main display 12, other display device, or other output device (e.g., speakers, lights, communication device, etc.) to change from a first state to at least a second state, wherein the second state of the main display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
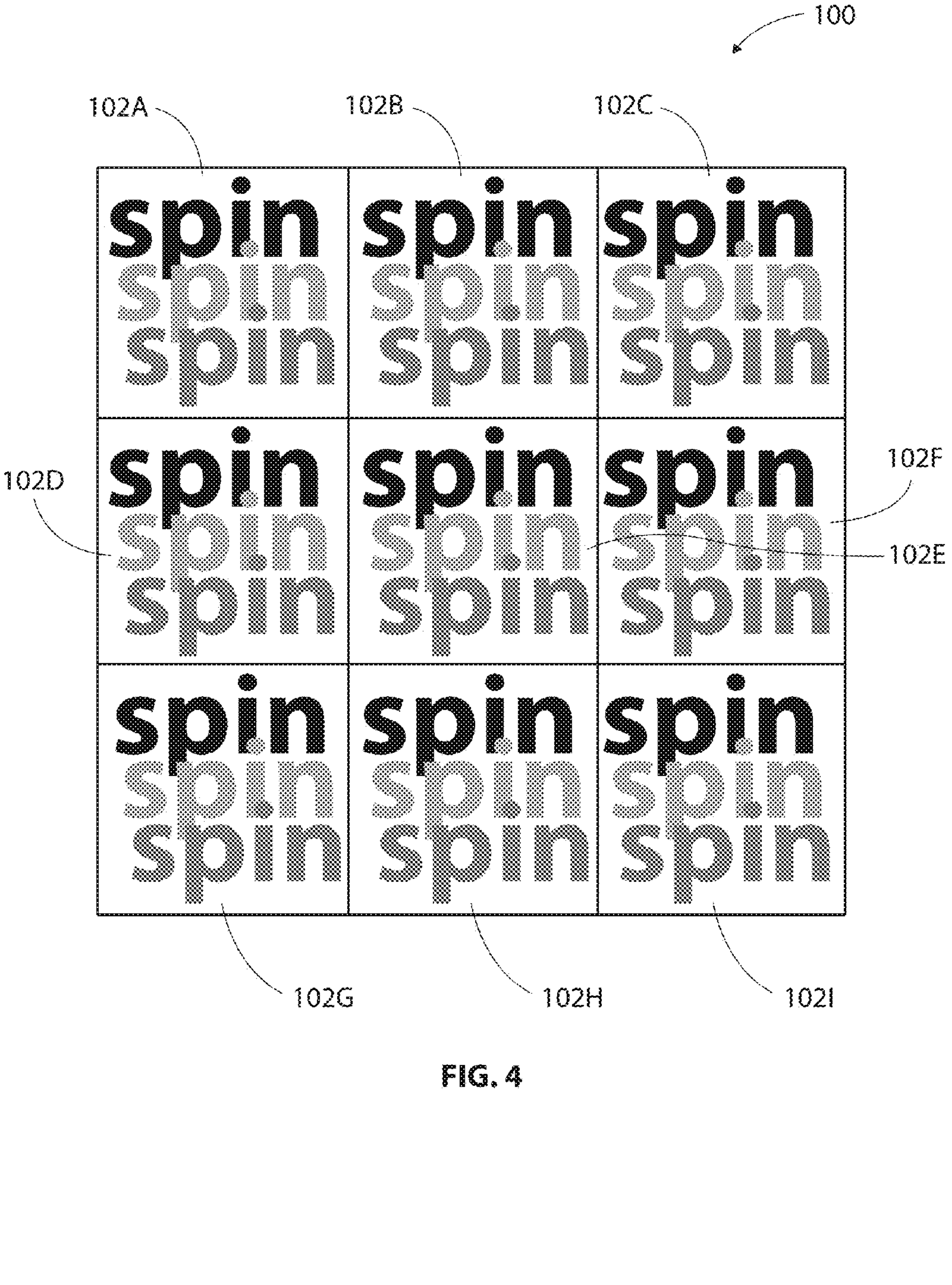
FIG. 4 is an image of a screen displaying spinning of nine independent main reels in a main array of a wagering game.

Referring now to FIG. 4, an illustrated image of a wagering game screen is adapted to be displayed on the main display area 12 or the secondary display area 14. The game screen portrays a main array 100 with a plurality of symbol-bearing main reels 102A-102I displayed in main array positions. The main reels include a first main reel 102A, a second main reel 102B, a third main reel 102C, a fourth main reel 102D, a fifth main reel 102E, a sixth main reel 102F, a seventh main reel 102G, an eighth main reel 102H, and a ninth main reel 102I. The main array positions are arranged in the form of rows and columns, with each of the main reels 102A-102I being displayed in a respective main array position.

Thus, in this example, the main array 100 is a 3×3 array with three reels extending from left to right in the main array positions across the rows of the main array 100, and with three reels extending from top to bottom in the main array positions across the columns of the main array 100. By way of further example, the first main reel 102A is displayed in a top-left main array position. In other examples, the main array 100 can have a different number of columns and rows, and the columns may be formed by reels or any other suitable mechanic to populate the array, such as cascading symbols or other visual illustration of symbols populating the array positions.

In FIG. 4, each of the main reels 102A-102I is illustrated in a spinning motion. Eventually, the main reels 102A-102I stop spinning and are populated with respective main symbols. For example, in FIG. 10 an "A" main symbol is illustrated in the top-left main array position associated with the first main reel 102A).

Figure 5:
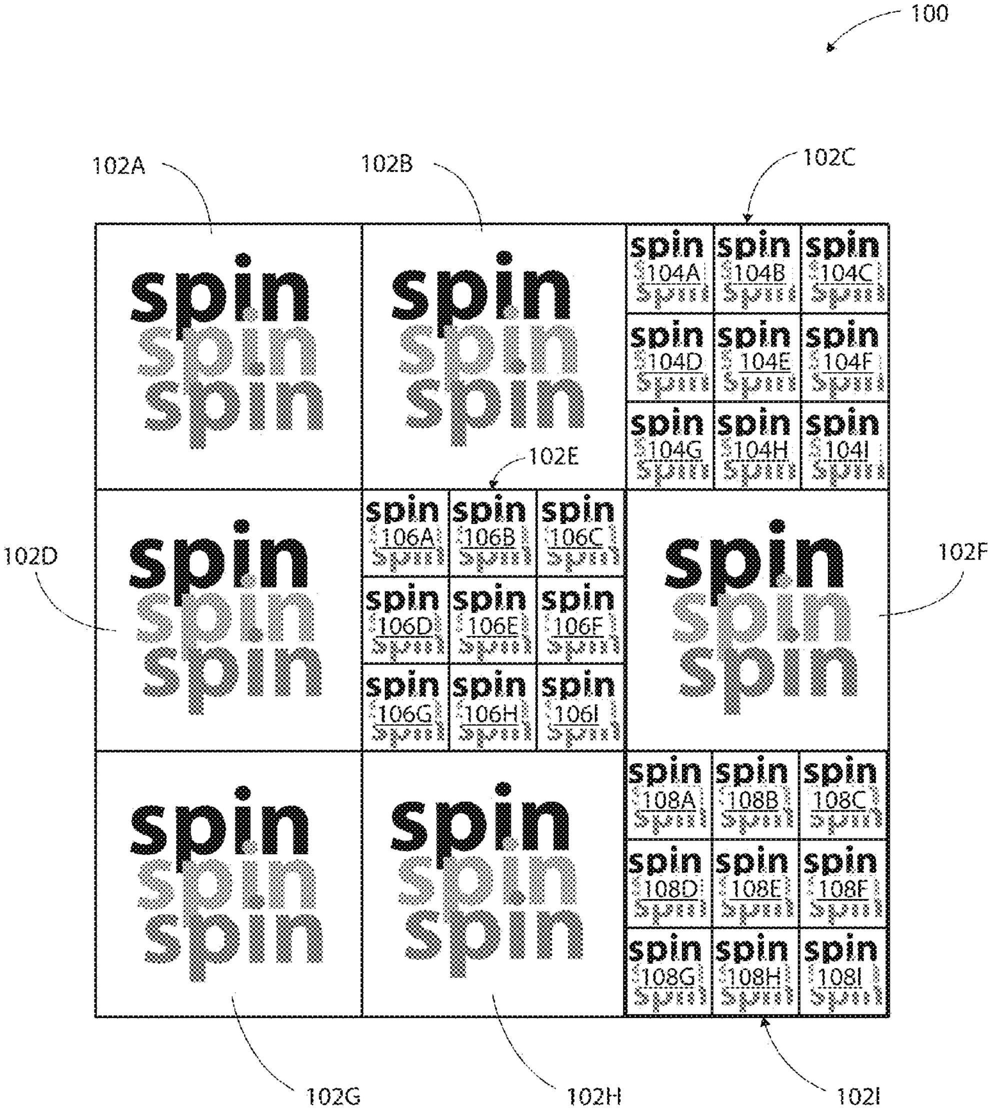
FIG. 5 is an image illustrating displaying sub-arrays with spinning secondary reels in some positions of the main array of FIG. 4.

Referring to FIG. 5, three of the main reels 102C, 102E, and 102I have been randomly transformed into respective sub-arrays. In other words, the respective—special—positions associated with the three main reels 102C, 102E, and 102I are now displayed into respective sub-array. Specifically, the third main reel 102C has been transformed into a first sub-array, the fifth main reel 102E has been transformed into a second sub-array, and the ninth main reel 102I has been transformed into a third sub-array. The three respective (or special) positions associated with the main reels 102C, 102E, and 102I In this example, each of the sub-arrays 102C, 102E, and 102I includes a plurality of nine independent secondary reels, which are arranged in respective secondary array positions. The first sub-array 102C has nine secondary reels 104A-104I, the second sub-array 102E has nine secondary reels 106A-106I, and the third sub-array 102I has nine secondary reels 108A-108I. In other examples, the sub-arrays can have any number of two or more secondary reels. Each of the secondary reels is currently spinning.

Figure 6:
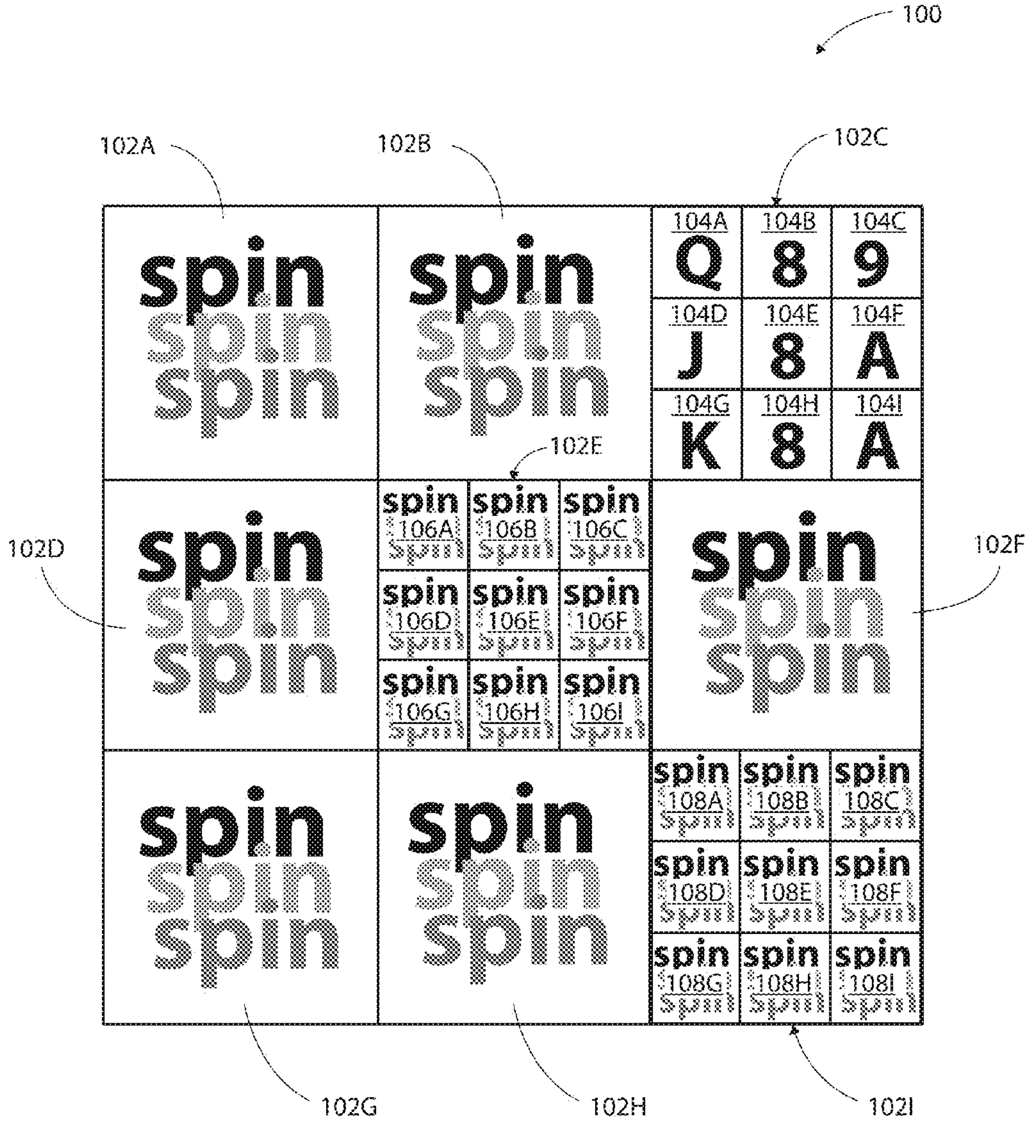
FIG. 6 is an image illustrating an outcome of a first sub-array of FIG. 5.

Referring to FIG. 6, the secondary reels 104A-104I of the first sub-array 102C have stopped spinning and the first sub-array 102C is shown populated with secondary symbols. The secondary position associated with each secondary reel 104A-104I now displays a respective secondary symbol. For example, a "Q" secondary symbol is displayed in the top-left position 104A, an "8" secondary symbol is displayed in the top-center position 104B, etc.

Although the secondary reels 104A-104I of the first sub-array 102C have stopped spinning, the remainder of the primary reels (which have not been transformed in sub-array, i.e., the first reel 102A, the second reel 102B, the fourth reel 102D, the sixth reel 102F, the seventh reel 102G, and the eighth reel 102H) continue spinning Additionally, in this example the secondary reels 106A-106I of the second sub-array 102E and the secondary reels 108A-108I of the third sub-array 102I continue spinning after the secondary reels 104A-104I of the first sub-array 102C have stopped spinning. However, in other examples the secondary reels of different sub-arrays can stop in any order and/or simultaneously. For example, the secondary reels 106A-106I of the second sub-array 102E can stop before or simultaneous with the secondary reels 104A-104I of the first sub-array 102C.

Figure 7:
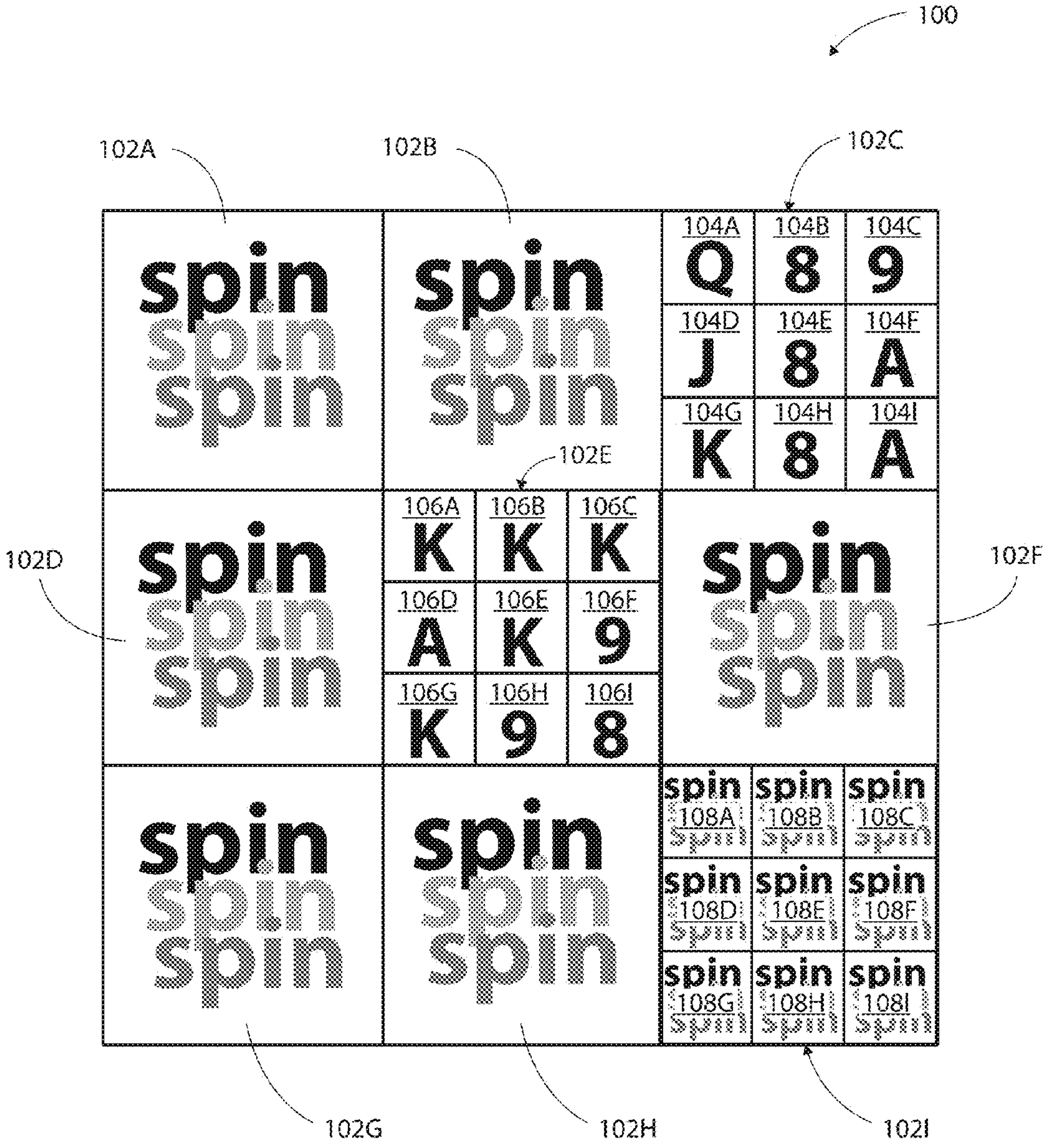
FIG. 7 is an image illustrating an outcome of a second sub-array of FIG. 5

Referring to FIG. 7, the secondary reels 106A-106I of the second sub-array 102E have stopped spinning and the second sub-array 102E is shown populated with secondary symbols. The secondary position associated with each secondary reel 106A-106I now displays a respective secondary symbol.

Figure 8:
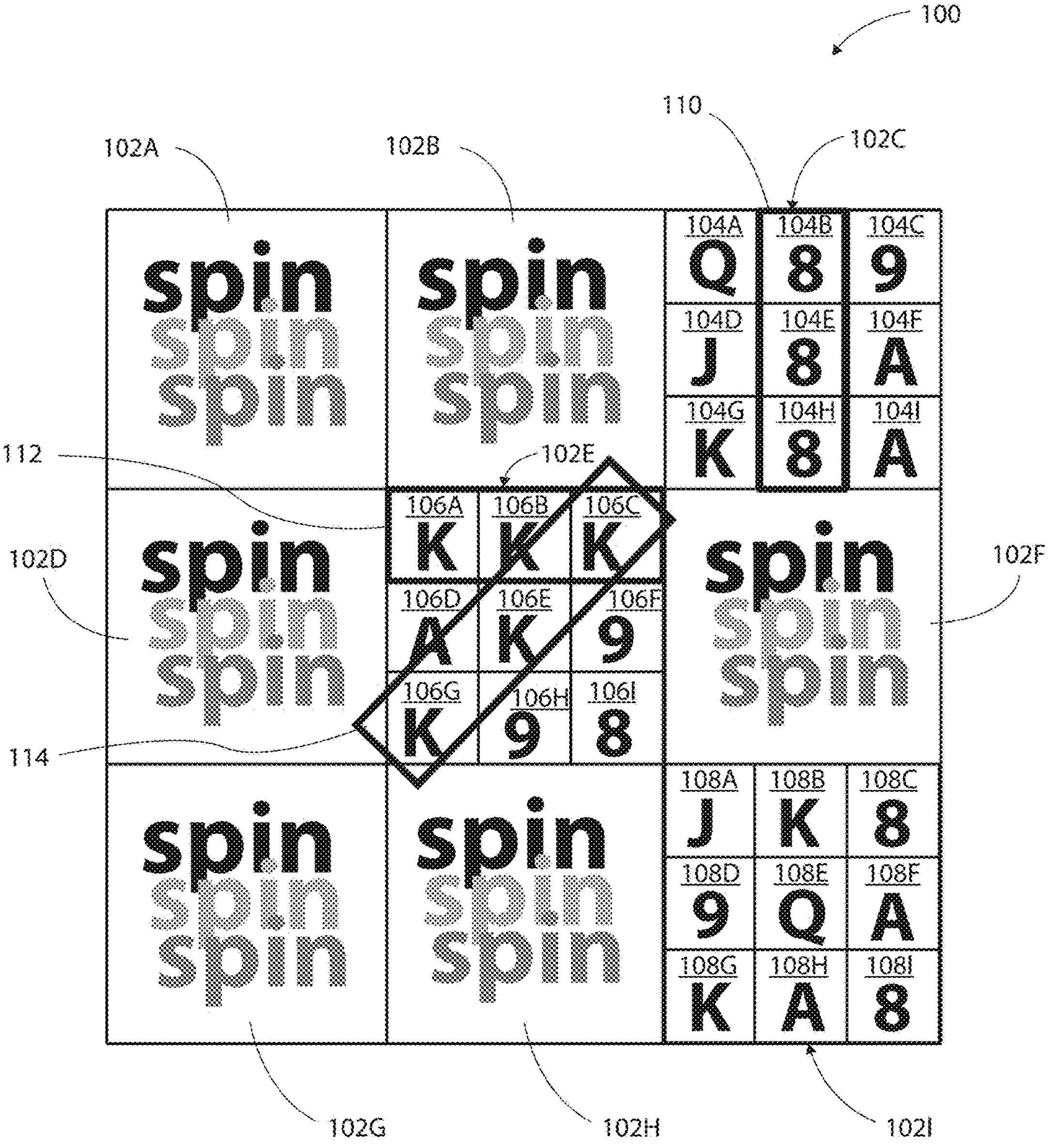
FIG. 8 is an image illustrating an outcome of a third sub-array of FIG. 5

Referring to FIG. 8, the secondary reels 108A-108I of the third sub-array 102I have stopped spinning and the third sub-array 102I is shown populated with secondary symbols. The secondary position associated with each secondary reel 108A-108I now displays a respective secondary symbol.

Each of the sub-arrays 102C, 102E, and 102I are evaluated for any winning combinations. For example, the outcome of the first sub-array 102C displays an "8" three-of-a-kind winning combination 110. The second sub-array 102E displays two "K" three-of-a-kind winning combinations 112, 114. The third sub-array 102I does not display any winning combinations.

Figure 9:
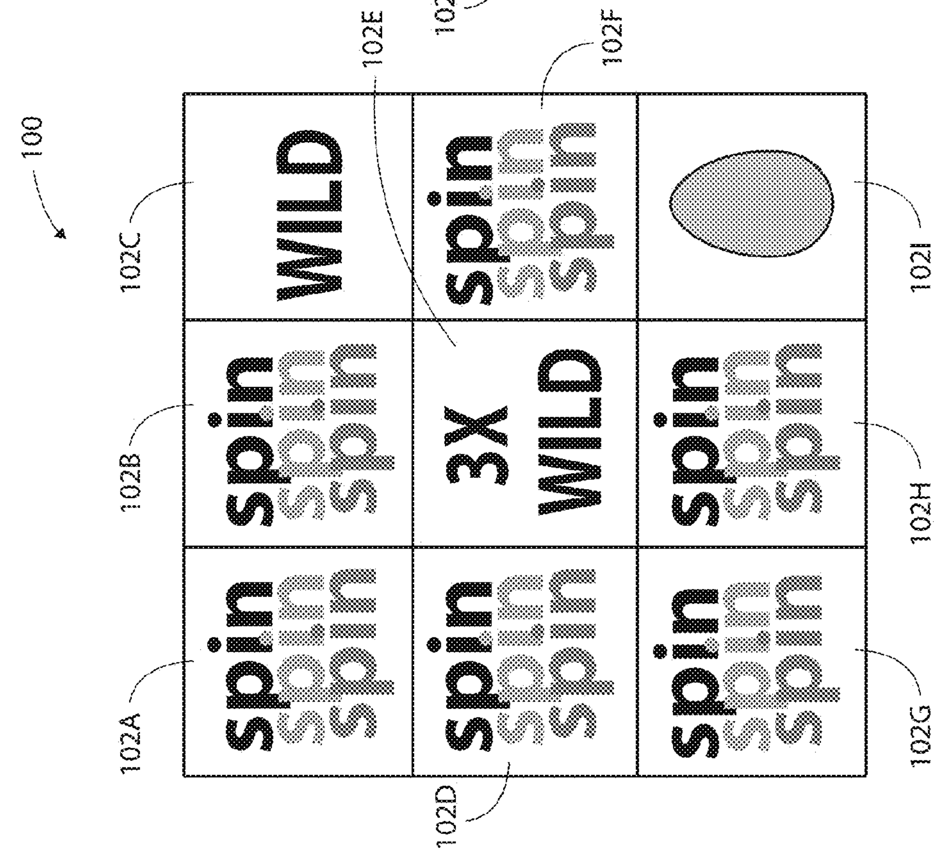
FIG. 9 is an image illustrating special symbols displayed in response to respective outcomes of the sub-arrays of FIG. 5.

Referring to FIG. 9, special symbols are determined, respectively, in response to the outcomes of the sub-arrays 102C, 102E, and 102I. For the first sub-array 102C, the single pay results in a "WILD" special symbol populating the respective primary position 102C in the main array 100. Thus, according to this example, if the outcome of a sub-array results in at least one pay, the respective primary position is populated by a "WILD" symbol.

For the second sub-array 102E, the two pays result in a "3× WILD" special symbol populating the respective primary position 102E in the main array 100. Thus, according to this example, the "WILD" special symbol becomes a multiplying "WILD" if the pays reach a threshold (e.g., threshold number of paylines, threshold value of pays, etc.).

For the third sub-array 102I, there are no pays. As such, the respective primary position 102I in the main array 100 is populated with a "SCATTER" symbol. It is understood that in other examples, any other special symbol can result based on any outcome.

Figure 10:
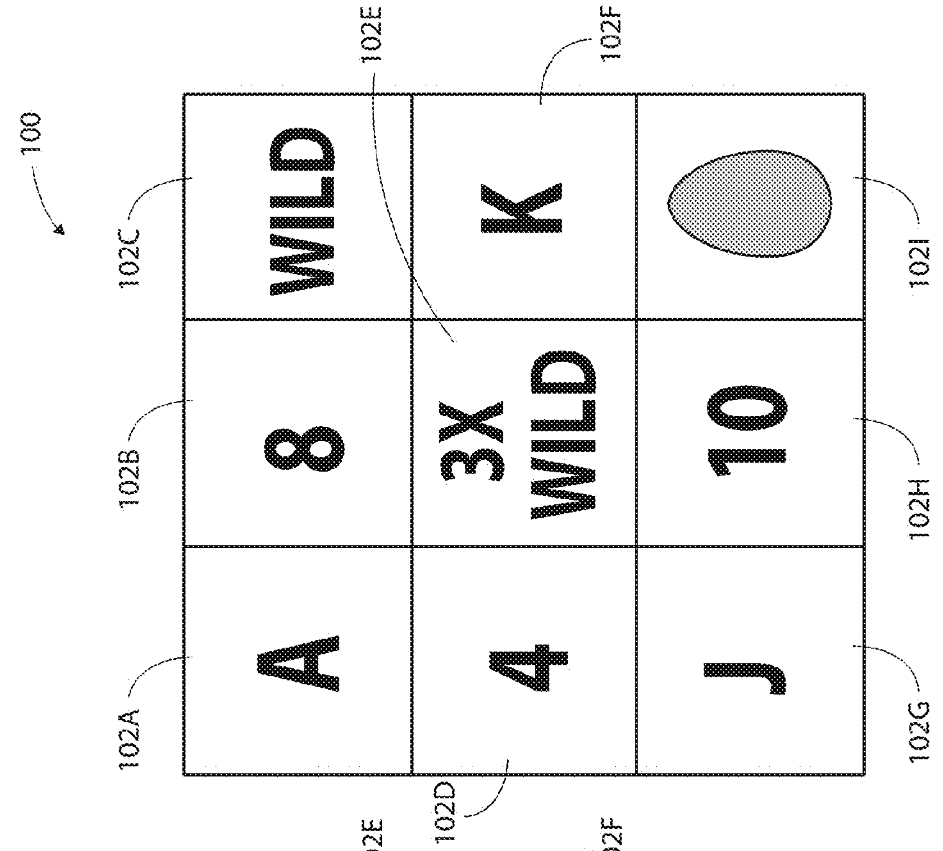
FIG. 10 is an image illustrating an outcome of the main array of FIG. 4, including primary symbols and the special symbols.

Referring to FIG. 10, when all the sub-arrays 102C, 102E, and 102I have resolved themselves, and the special symbols into which the sub-arrays 102C, 102E, and 102I have transformed into appear, the remaining main reels 102A, 102B, 102D, 102F, 102G, and 102H stop and show the respective main symbols (e.g., "A" main symbol in the top-left main reel 102A, "8" main symbol in the top-center main reel 102B, etc.).

Referring to FIGS. 11-14, according to other examples, a main array can have any number of main reels and a sub-array can have any number of secondary reels. Furthermore, the sub-arrays can be further sub-divided into sub-sub-arrays, and so on. Thus, instead of the main and secondary array positions being independent, single-symbol reels, the main and secondary array positions can be any combination of single and/or multiple symbol reels.

Figure 11:
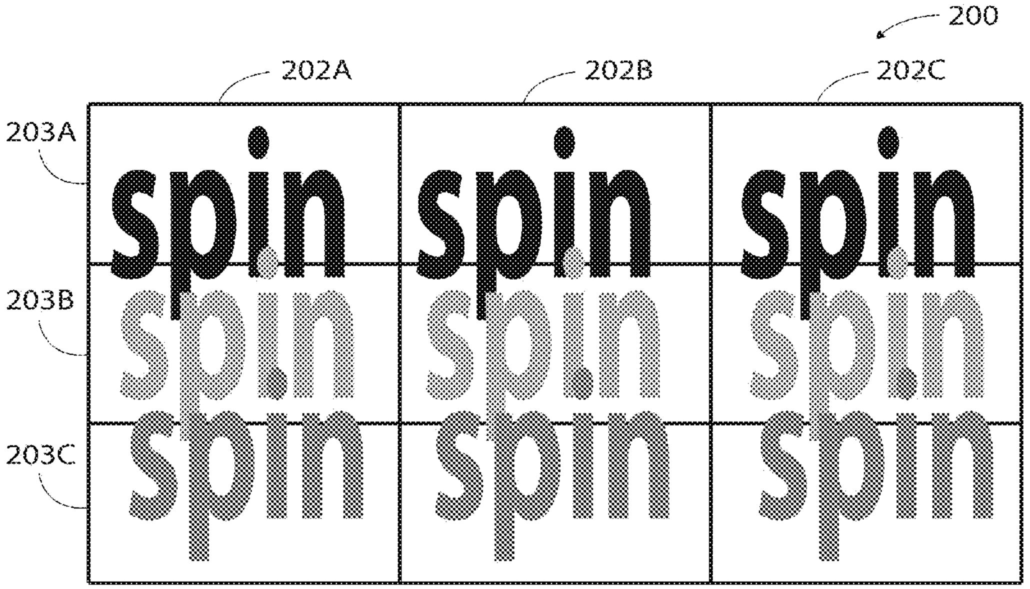
FIG. 11 is an image of a screen displaying spinning of three independent main reels in a main array of a wagering game.

For example, referring to FIG. 11, instead of having an independent reel for each main position, a main array 200 can have less independent reels than the number of main positions. By way of a specific example, the main 3×3 array 200 can have only three independent main reels 202A-202C, with each main reel having three main positions (top, middle, and bottom positions 203A-203C). As such, one or more of the main reels 202A-202C can be randomly selected for transforming into respective sub-arrays.

Figure 12:
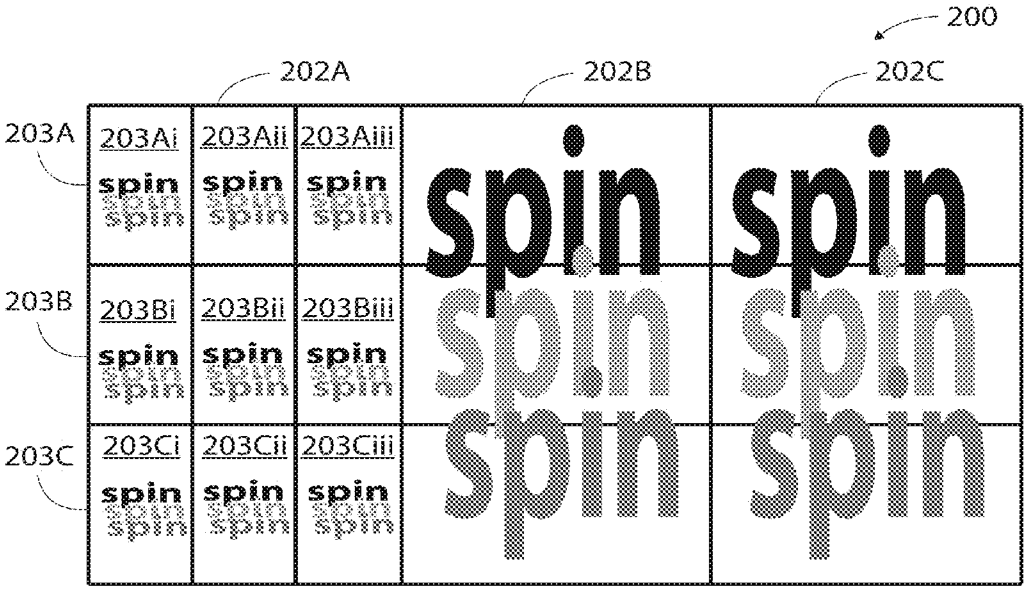
FIG. 12 is an image illustrating displaying a sub-array with spinning secondary reels in some positions of the wagering game of FIG. 11.

Referring to FIG. 12, the left main reel 202A is transformed into a 9×9 sub-array having nine secondary positions 203Ai-203Ciii, each main position 203A-203C being sub-divided into three respective secondary positions 203Ai-203Aiii, 203Bi-203Biii, and 203Ci-203Ciii. All reels—main and secondary—are spinning at this point. In other examples, the left main reel 202A is transformed into a sub-array having any number of rows and columns. For example, instead of the 3×3 sub-array, the left main reel can be transformed into a 4×6 sub-array in which each of the main positions is sub-divided into six respective secondary positions (3×3 sub-sub-array).

Figure 13:
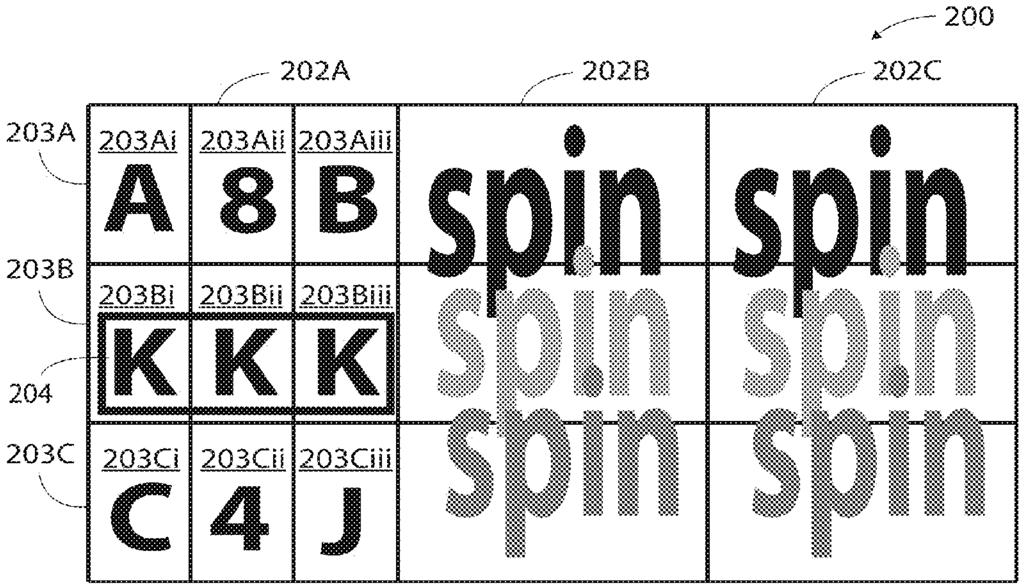
FIG. 13 is an image illustrating an outcome of the sub-array of FIG. 12.

Referring to FIG. 13, the sub-array 202A resolves itself into secondary symbols. As illustrated, a three-of-a-kind "K" winning combination 204 is achieved in the secondary positions 203Bi-203Biii. The remainder of the main reels 202B and 202C, which have not been transformed into a sub-array, continue spinning at this point.

Figure 14:
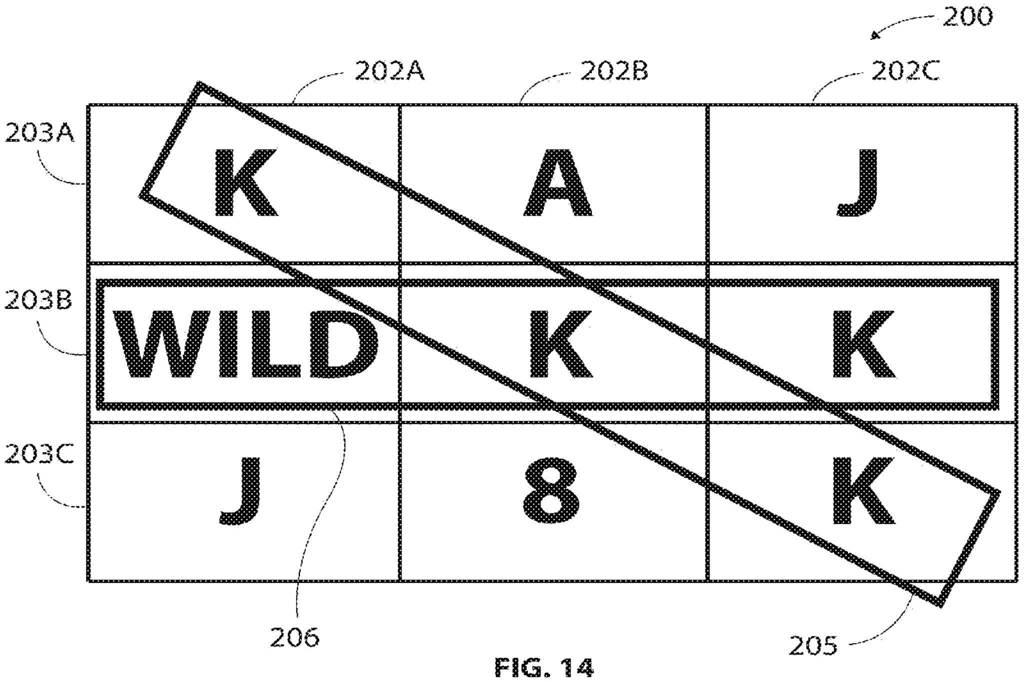
FIG. 14 is an image illustrating an outcome of the main array of FIG. 11, including primary symbols and special symbols.

Referring to FIG. 14, the outcome of the sub-array 202A results in a "J" special symbol in the top position 203A of the left main reel 202A, a "WILD" special symbol in the middle position 203B of the left main reel 202A, and a "K" special symbol in the bottom position 203C of the left main reel 202A. The center and right main reels 202B and 202C are also now stopped. Upon evaluating the outcome of the main array 200, it is determined that two winning combinations 205, 206 are achieved in the main array 200.

Figure 15:
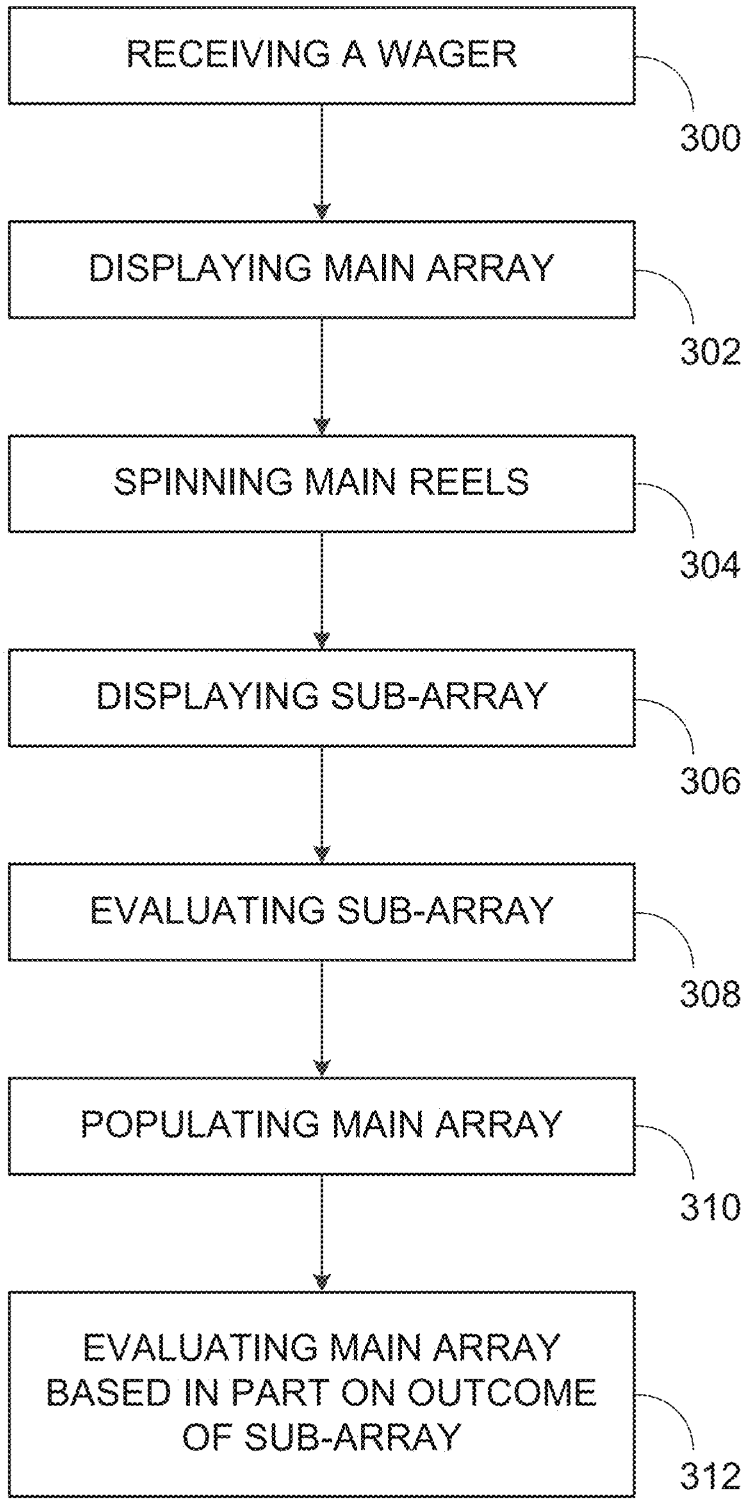
FIG. 15 is a diagram illustrating wagering gameplay in which outcomes of main arrays are determined at least in part based on outcomes of sub-arrays.

Referring to FIG. 15, a computer-implemented method in a gaming system, such as described above in reference to FIGS. 1-3, includes receiving at step 300 a wager in response to an input via at least one input device of one or more input devices. At step 302, a main array with main array positions is displayed on at least one display device of one or more display devices. The main array has main array positions and a plurality of main reels.

At step 304, the plurality of main reels is displayed as spinning, by at least one of one or more processors. At step 306, in response to the spinning of the plurality of main reels, at least one sub-array is randomly displayed by at least one of the one or more processors. The sub-array is randomly displayed at one or more, but not all, of the main array positions and includes a plurality of secondary reels.

At step 308, while the remainder of the plurality of main reels is still spinning, the plurality of secondary reels of the at least one sub-array are in a spinning motion, then stopped, and then evaluated by at least one of the one or more processors. The evaluation determines one or more special symbols for populating at least one of the main array positions.

At step 310, in response to determining the one or more special symbols, the spinning of the reminder of the plurality of main reels is stopped by at least one of the one or more processors. The main array positions are populated with primary symbols and the one or more special symbols determined by the evaluation of the secondary reels at step 308.

At step 312, the main array is evaluated by at least one of the one or more processors. A determination is made whether a main winning combination is achieved in the main array. The evaluation is based on both the primary symbols and the one or more special symbols.

In other examples, other types of sub-arrays are used in determining the special symbols. For example, instead of sub-arrays with spinning reels, a deck-of-cards is used in which initially hidden symbols are revealed either by random selection of a processors, or by manual player selection.

Each of these embodiments and obvious variations thereof is contemplated as falling within the spirit and scope of the claimed invention, which is set forth in the following claims.

What is claimed is:

1. A gaming system, comprising:

a gaming machine primarily dedicated to playing at least one casino wagering game, the gaming machine including an electronic display device and one or more electronic input devices; and one or more controllers configured to:

detect, via at least one of the one or more electronic input devices, a physical item associated with a monetary value that establishes a credit balance;

initiate the casino wagering game in response to an input indicative of a wager covered by the credit balance;

display on the electronic display device at least one main array with a plurality of main positions arranged in a plurality of main rows and columns, randomly transform a special position of the plurality of main positions into a sub-array having a plurality of secondary positions arranged in a plurality of secondary rows and columns, determine an outcome for the sub-array in which the plurality of secondary positions is populated with respective secondary symbols, in response to the outcome for the sub-array, determine a special symbol associated with the special position of the main array, the special symbol having a predetermined association with the sub-array outcome, display on the electronic display device any determined special symbols for each of the randomly transformed special positions, populate the plurality of main positions in the main array with a plurality of main symbols, the main array including the plurality of main symbols populating the main positions and any determined special symbols populating the transformed special positions, evaluate the main array to determine if a main winning combination is achieved, and receive, via at least one of the one or more electronic input devices, a cashout input that initiates a payout from the credit balance.

2. The gaming system of claim 1, wherein at least one of the main array and the sub-array includes respective spinning reels.

3. The gaming system of claim 1, wherein each main position of the plurality of main positions includes a respective spinning reel.

4. The gaming system of claim 1, wherein the special position occupies a space extending across a single row and a single column of the plurality of main rows and columns.

5. The gaming system of claim 1, wherein the special position occupies a space extending across at least two rows or two columns of the plurality of main rows and columns.

6. The gaming system of claim 1, wherein the outcome for the sub-array includes at least one secondary winning combination.

7. The gaming system of claim 6, wherein the at least one secondary winning combination is randomly selected from a plurality of secondary winning combinations, the plurality of secondary winning combinations being associated with respective special symbols, the at least one secondary winning combination being associated with the special symbol.

8. The gaming system of claim 1, wherein the special symbol is a game-enhancement parameter.

9. A gaming system, comprising:

a gaming machine primarily dedicated to playing at least one casino wagering game, the gaming machine including an electronic display device and one or more electronic input devices; and one or more controllers configured to:

detect, via at least one of the one or more electronic input devices, a physical item associated with a monetary value that establishes a credit balance;

initiate the casino wagering game in response to an input indicative of a wager covered by the credit balance;

in response to receiving the wager, display on the electronic display device a main array with main array positions and having a plurality of main reels, spin the plurality of main reels, in response to the spinning of the plurality of main reels, randomly display on the electronic display device one or more sub-arrays at one or more, but not all, of the main array positions, the one or more sub-arrays having a plurality of secondary reels, while the remainder of the plurality of main reels is still spinning, spin, stop, and evaluate the plurality of secondary reels of the one or more sub-arrays to determine one or more special symbols for populating at least one of the main array positions, in response to determining the one or more special symbols, stop the spinning of the remainder of the plurality of main reels and populate the main array positions with primary symbols and the one or more special symbols, evaluate the main array to determine if a main winning combination is achieved, the evaluation being based on both the primary symbols and the one or more special symbols, and receive, via at least one of the one or more electronic input devices, a cashout input that initiates a payout from the credit balance.

10. The gaming system of claim 9, wherein each of the main array positions includes a respective reel of the plurality of main reels.

11. The gaming system of claim 9, wherein at least one of the one or more sub-arrays has sub-array positions, each of the sub-array positions including a respective reel of the plurality of secondary reels.

12. The gaming system of claim 9, wherein the one or more sub-arrays is a single sub-array and the one or more special symbols is a single special symbol, the special symbol populating a single position of the main array positions.

13. The gaming system of claim 9, wherein the one or more sub-arrays is a single sub-array and the one or more special symbols is a single special symbol, the special symbol populating two or more positions of the main array positions.

14. The gaming system of claim 9, wherein the evaluation of the plurality of secondary reels determines at least one secondary winning combination.

15. The gaming system of claim 14, wherein the at least one secondary winning combination is randomly selected from a plurality of secondary winning combinations, the plurality of secondary winning combinations being associated with respective special symbols.

16. A method of operating a gaming system, the gaming system including one or more controllers and a gaming machine, the gaming machine primarily dedicated to playing at least one casino wagering game, the gaming machine including an electronic display device and one or more electronic input devices, the method comprising:

detecting, via at least one of the one or more electronic input devices, a physical item associated with a monetary value that establishes a credit balance;

initiating the casino wagering game in response to an input indicative of a wager covered by the credit balance;

displaying on the electronic display device a main array with main array positions and having a plurality of main reels;

spinning, via at least one of the one or more controllers, the plurality of main reels;

in response to the spinning of the plurality of main reels, randomly displaying on the electronic display device at least one sub-array at one or more, but not all, of the main array positions, the at least one sub-array having a plurality of secondary reels;

while the remainder of the plurality of main reels is still spinning, spinning, stopping, and evaluating, via at least one of the one or more controllers, the plurality of secondary reels of the at least one sub-array to determine one or more special symbols for populating at least one of the main array positions;

in response to determining the one or more special symbols, stopping, via at least one of the one or more controllers, the spinning of the remainder of the plurality of main reels and populating the main array positions with primary symbols and the one or more special symbols;

evaluating, via at least one of the one or more controllers, the main array to determine if a main winning combination is achieved, the evaluation being based on both the primary symbols and the one or more special symbols; and receiving, via at least one of the one or more electronic input devices, a cashout input that initiates a payout from the credit balance.

17. The method of claim 16, further comprising populating, via at least one of the one or more controllers, a single position of the main array positions with a single special symbol of the one or more special symbols.

18. The method of claim 16, further comprising determining, via at least one of the one or more controllers, a secondary winning combination in response to evaluating the plurality of secondary reels.

19. The method of claim 16, further comprising:

in response to the spinning of the plurality of main reels, randomly displaying on the electronic display device at least one other sub-array at another one of the main array positions, the other sub-array having another plurality of secondary reels;

while the remainder of the plurality of main reels is still spinning, spinning, stopping, and evaluating, via at least one of the one or more controllers, the another plurality of secondary reels of the other sub-array to determine another special symbol for populating another one of the main array positions; and evaluating, via at least one of the one or more controllers, the main array based on the primary symbols, the one or more special symbols, and the another special symbol.

20. The method of claim 16, wherein at least one of the one or more special symbols is a game-enhancement parameter.

* * * * *